United States Patent
Propheter-Hinckley et al.

(10) Patent No.: US 12,135,209 B2
(45) Date of Patent: Nov. 5, 2024

(54) AIRFOIL TOOL MOUNT

(71) Applicant: RAYTHEON TECHNOLOGIES CORPORATION, Farmington, CT (US)

(72) Inventors: Tracy A. Propheter-Hinckley, Rocky Hill, CT (US); Derek J. Michaels, Southington, CT (US); Garrett Kernozicky, Mansfield, CT (US)

(73) Assignee: RTX CORPORATION, Farmington, CT (US)

( * ) Notice: Subject to any disclaimer, the term of this patent is extended or adjusted under 35 U.S.C. 154(b) by 294 days.

(21) Appl. No.: 17/702,486

(22) Filed: Mar. 23, 2022

(65) Prior Publication Data

US 2023/0314116 A1 Oct. 5, 2023

(51) Int. Cl.
G01B 5/00 (2006.01)
F02C 7/00 (2006.01)
G01B 5/008 (2006.01)
G01B 11/24 (2006.01)
G06T 17/00 (2006.01)

(52) U.S. Cl.
CPC ............... *G01B 5/008* (2013.01); *F02C 7/00* (2013.01); *G01B 11/24* (2013.01); *G06T 17/00* (2013.01); *F05D 2220/32* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 5,822,841 A | 10/1998 | Bales et al. | |
| 6,994,000 B2 | 2/2006 | Louthan et al. | |
| 7,204,926 B2 | 4/2007 | Lamphere et al. | |
| 8,434,224 B2 | 5/2013 | Berlanger et al. | |
| 8,464,425 B2 | 6/2013 | Berlanger et al. | |
| 8,505,202 B2 * | 8/2013 | Berlanger | B24C 1/045 29/418 |
| 2016/0292308 A1 * | 10/2016 | Huckerby | G06F 30/00 |
| 2019/0308319 A1 * | 10/2019 | Walters | B25J 9/0084 |

FOREIGN PATENT DOCUMENTS

| | | |
|---|---|---|
| JP | 0349870 | 3/1991 |
| KR | 101733361 | 5/2017 |

OTHER PUBLICATIONS

European Patent Office, European Search Report dated Dec. 12, 2023 in Application No. 23163580.6.

* cited by examiner

*Primary Examiner* — Brandi N Hopkins
*Assistant Examiner* — Nigel H Plumb
(74) *Attorney, Agent, or Firm* — SNELL & WILMER L.L.P.

(57) ABSTRACT

An inspection device is disclosed herein. In various embodiments, the inspection system device comprises: a support structure; a motor, a shaft operably coupled to the motor, the shaft extending from a first side of the support structure to a second side of the support structure, the shaft configured to couple to a bladed rotor; and a scanner moveably coupled to the support structure, the scanner configured to generate a three-dimensional model for the bladed rotor.

17 Claims, 15 Drawing Sheets

AIRFOIL TOOL MOUNT

FIELD

The present disclosure relates to inspection systems and methods, and more particularly to, inspection systems and methods for integrally bladed rotors.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., integral) with the blades spaced around the circumference of the rotor disk. Conventional IBRs may be formed using a variety of technical methods including integral casting, machining from a solid billet, or by welding or bonding the blades to the rotor disk.

SUMMARY

An inspection device is disclosed herein. In various embodiments, the inspection system device comprises: a support structure; a motor; a shaft operably coupled to the motor, the shaft extending from a first side of the support structure to a second side of the support structure, the shaft configured to couple to a bladed rotor; and a scanner moveably coupled to the support structure, the scanner configured to generate a three-dimensional model for the bladed rotor.

In various embodiments, the inspection device further comprises a track system, the scanner configured to move along the track system. The track system may comprise a curved track and a vertical track, the scanner operably coupled to the vertical track, the vertical track configured to travel along the curved track. The support structure may comprises a base having an arcuate shape, the curved track coupled to the base.

In various embodiments, the scanner is one of a coordinate measuring machine or a structured light scanner.

In various embodiments, the three-dimensional model is a point cloud. The inspection device may further comprise a controller in electronic communication with the motor and the scanner. The controller may be configured to: command the scanner to scan a first portion of the bladed rotor; command the motor to rotate the shaft a fixed amount; and subsequently command the scanner to scan a second portion of the bladed rotor. The controller may be further configured to: determine the motor has rotated the shaft 360 degrees; and generate a three-dimensional model based on data received from the scanner.

An article of manufacture is disclosed herein. The article of manufacture may include a tangible, non-transitory computer-readable storage medium having instructions stored thereon that, in response to execution by a processor, cause the processor to perform operations comprising: commanding, via the processor, a scanner to scan a first portion of a bladed rotor; commanding, via the processor, a motor to rotate a shaft coupled to the bladed rotor a fixed amount; commanding, via the processor, the scanner to scan a second portion of the bladed rotor; determining, via the processor, whether the scanner has scanned between 95% and 100% of an external surface area of the bladed rotor; and generating, via the processor, a three-dimensional model in response to determining the scanner has scanned between 95% and 100% of the external surface area of the bladed rotor.

In various embodiments, the first portion of the bladed rotor is a blade.

In various embodiments, generating the three-dimensional model includes generating a point cloud of the bladed rotor.

In various embodiments, the scanner comprises one of a coordinate measuring machine (CMM) or a structured light scanner.

In various embodiments, the operations further comprise receiving, via the processor, location data of the scanner relative to a datum; and generating the three-dimensional model relative to the datum.

An inspection system for a bladed rotor is disclosed herein. The inspection system may comprise: a support structure; a first sensor; a second sensor; a scanner moveably coupled to the support structure; a motor operably coupled to a shaft, the shaft rotatably coupled to the support structure, the shaft configured to be coupled to the bladed rotor; and a controller in electronic communication with the first sensor, the second sensor, the scanner, and the motor, the controller configured to: command the scanner to scan the bladed rotor; receive, from the first sensor, a location of the scanner during the scan; command the motor to rotate a fixed amount in between scans; determine, from the second sensor, an angular position of the bladed rotor relative to an initial position; and generate a three-dimensional model of the bladed rotor.

In various embodiments, the controller is further configured to command an inspection component to move the scanner relative to the bladed rotor during the scan.

In various embodiments, the inspection system further comprises a track system, the scanner configured to travel along the track system.

In various embodiments, the scanner comprises one of a coordinate measuring machine (CMM) or a structured light scanner.

In various embodiments, the three-dimensional model of the bladed rotor is a point cloud.

In various embodiments, the inspection system is configured to scan between 99% and 100% of an external surface area of the bladed rotor.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
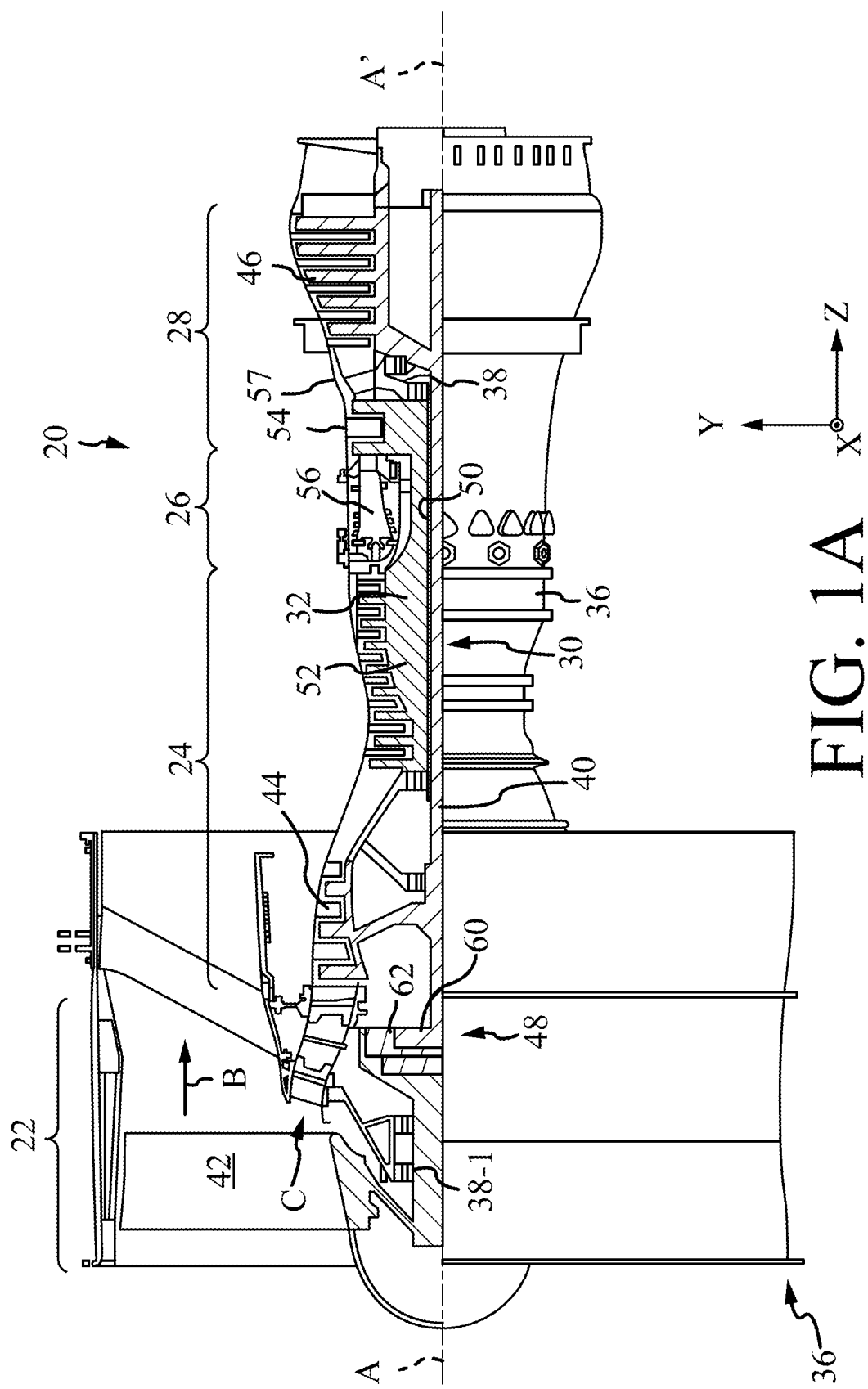
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
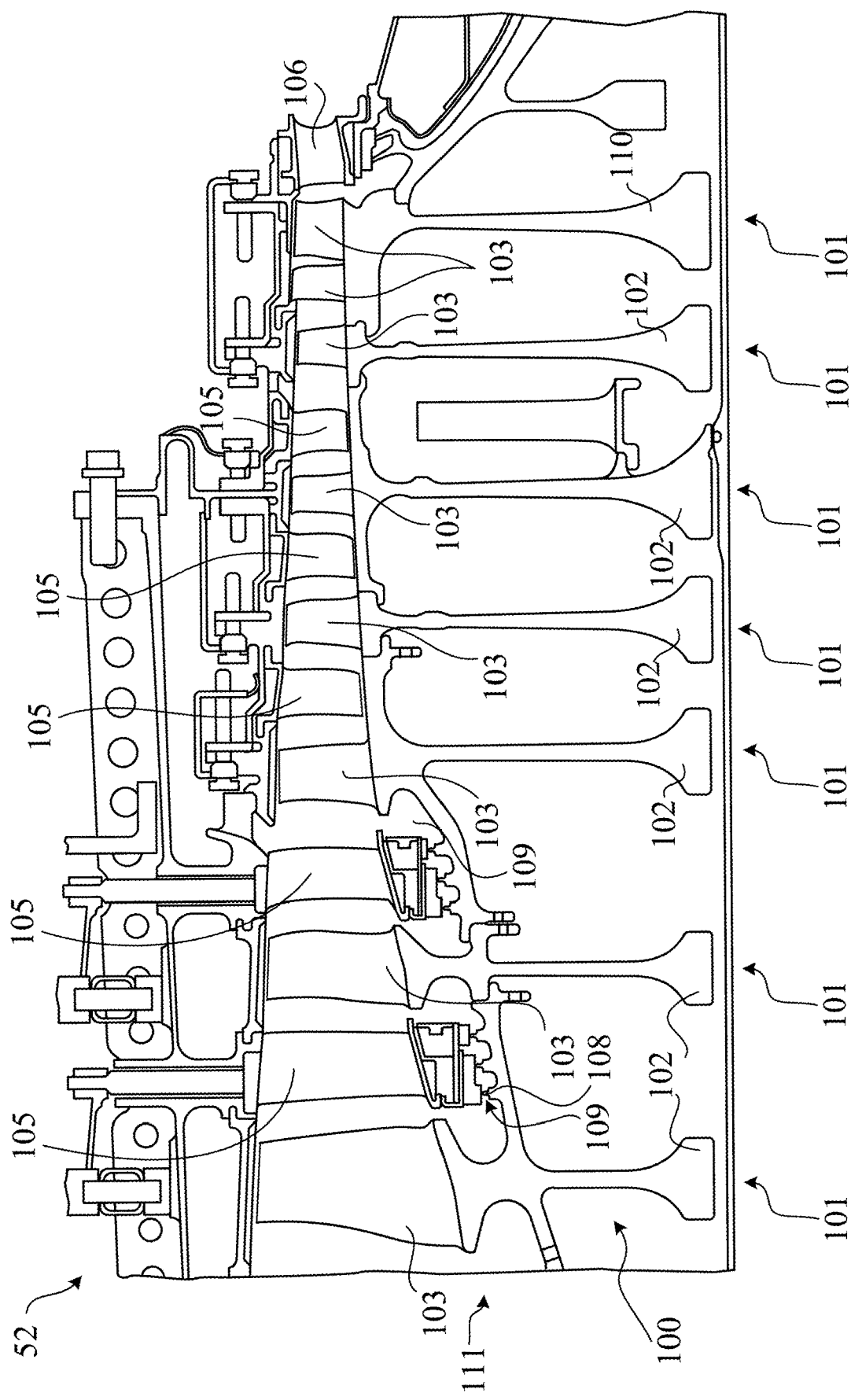
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include an integrally bladed rotor ("IBR") 100, such that the blades 103 and rotor disks 102 are formed from a single integral component (i.e., a monolithic component formed of a single piece). The blades 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and stator stages 105, each blade stage in the plurality of blade stages 101 including the IBR 100 and still be within the scope of this disclosure. In various embodiments, the plurality of blade stages 101 form a stack of IBRs 110, which define, at least partially, a rotor module 111 of the high pressure compressor 52 of the gas turbine engine 20.

In various embodiments, an IBR 100 disclosed herein may comprise a knife edge 108 of a knife edge seal assembly 109. The knife edge 108 is disposed between adjacent rotor stages in the plurality of blade stages 101 and configured to interface with a vane assembly in the plurality of vane stages 105. In various embodiments, the knife edge seal assembly 109 is configured to seal air flow from core flow path C from FIG. 1A during operation of the gas turbine engine 20 from FIG. 1A.

Figure 2A:
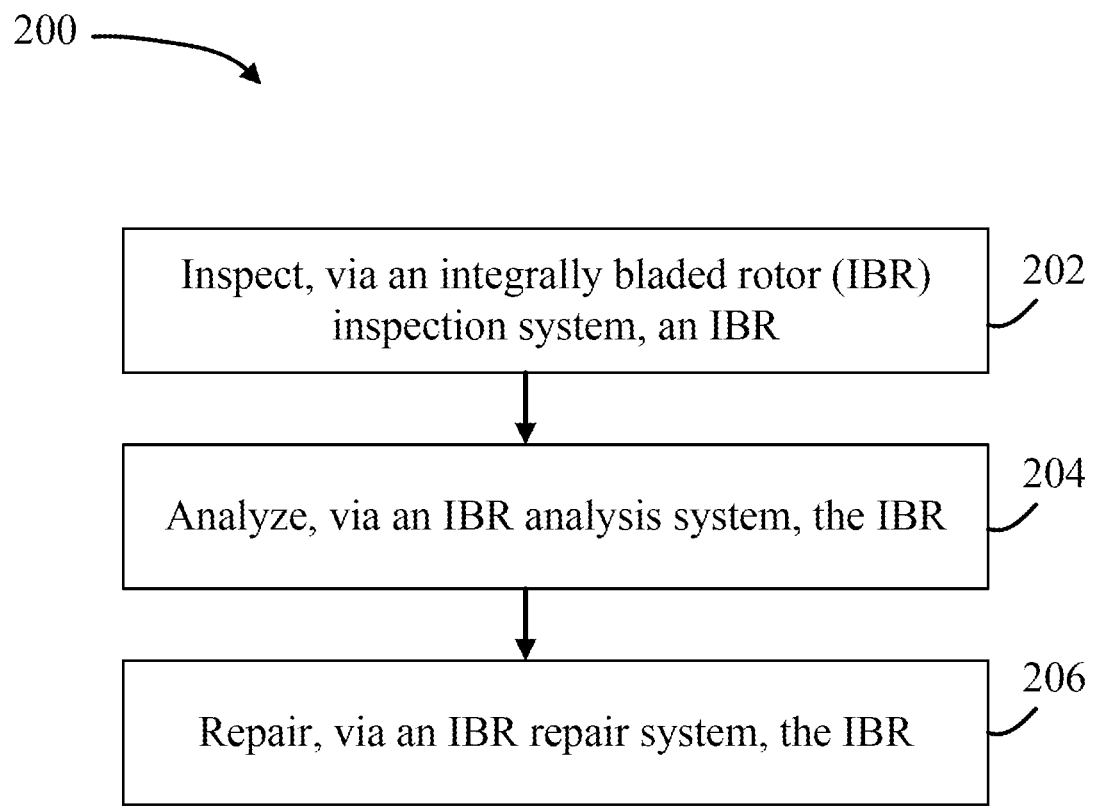
FIG. 2A illustrates a repair process for an integrally bladed rotor, in accordance with various embodiments.

Referring now to FIG. 2A, a method 200 for repairing an IBR 100 from FIG. 1B from a compressor section (e.g., compressor section 24) of a gas turbine engine 20 from FIG. 1A is illustrated, in accordance with various embodiments. For example, after a predetermined number of flight cycles, or due to an unscheduled maintenance, a gas turbine engine 20 from FIG. 1A is in operation, the method 200 may be performed for one or more of IBR 100 in the compressor section 24 of the gas turbine engine 20. In various embodiments, method 200 may be performed for IBRs 100 from several gas turbine engines (e.g., in accordance with gas turbine engine 20), which may facilitate various potential repair options as described further herein.

The method 200 comprises inspecting, via an IBR inspection system, an IBR 100 (step 202). As described further herein, step 202 may be performed for numerous IBRs 100 prior to proceeding to step 204. In various embodiments, step 202 may be performed for a single IBR 100 prior to proceeding to step 204. The present disclosure is not limited in this regard.

In various embodiments, inspecting the IBR comprises scanning, via the IBR inspection system, the IBR 100. In this regard, the IBR inspection system may comprise an optical scanner (e.g., structured light scanners, such as white light scanners, structured blue light scanners, or the like) and/or a coordinate-measuring machine. The present disclosure is not limited in this regard. In response to scanning the IBR 100, a digital representation of the IBR 100 (e.g., a point cloud, a surface model, or the like) is received by a controller and converted to a three-dimensional model (e.g., a computer Aided Design (CAD) model or Finite Element Model (FEM). The three-dimensional model may be utilized for analyzing the IBR 100 in step 204 of method 200.

The method 200 further comprises analyzing, via an IBR analysis system, the IBR (step 204). In various embodiments, by inspecting a plurality of IBRs in step 202, a system level analysis of various repair options may be performed in step 204. For example, the three-dimensional model produced from step 202 may be used as an input for blade level analysis (e.g., low-cycle fatigue, high cycle fatigue, Goodman diagram analysis, frequency, modal assurance criterion, etc.), stage level analysis (e.g., mistuning, aerodynamic performance, fatigue, imbalance, solidity, area and speed rotor sizing, etc.), and/or module level analysis (e.g., aerodynamic performance, compressor stack stiffness, clocking, clearances, axial gapping, imbalance, secondary flow influence, etc.). In this regard, by generating a three-dimensional model via step 202 outlined above, various forms of analysis may be performed to generate an optimal repair configuration (e.g., optimized for aerodynamic performance, optimized for cost of repair, etc.). The optimal repair configuration may be for an airfoil of a respective IBR 100, for the respective IBR 100 as a whole, or for stack of IBRs 110 from FIG. 1B. The present disclosure is not limited in this regard.

The method 200 further comprises repairing, via an IBR repair system, the IBR (step 206). In various embodiments, a repair model may be generated from the analyzing step 204 of method 200. In various embodiments, a plurality of repair models may be generated based on various factors as outlined previously herein. In this regard, a repair process may be determined based on the analyzing step 204. In various embodiments, the repair performed in step 206 may be a partial repair. For example, in the analyzing step 204, optimal repair configurations for remaining life of the IBR 100 may be determined as well. For example, typical repairs are determined based on the IBR 100 meeting manufacturing tolerances/specifications and meeting full life (e.g., 25,000 flight cycles, 50,000 flight cycles or the like). If the IBR 100 is set for only 10,000 additional flight cycles of when the IBR 100 is originally designed for 50,000 flight cycles, the analysis in step 204 may account for that and provide a partial repair option that meets full life to accomplish a faster and/or less expensive repair.

Figure 2B:
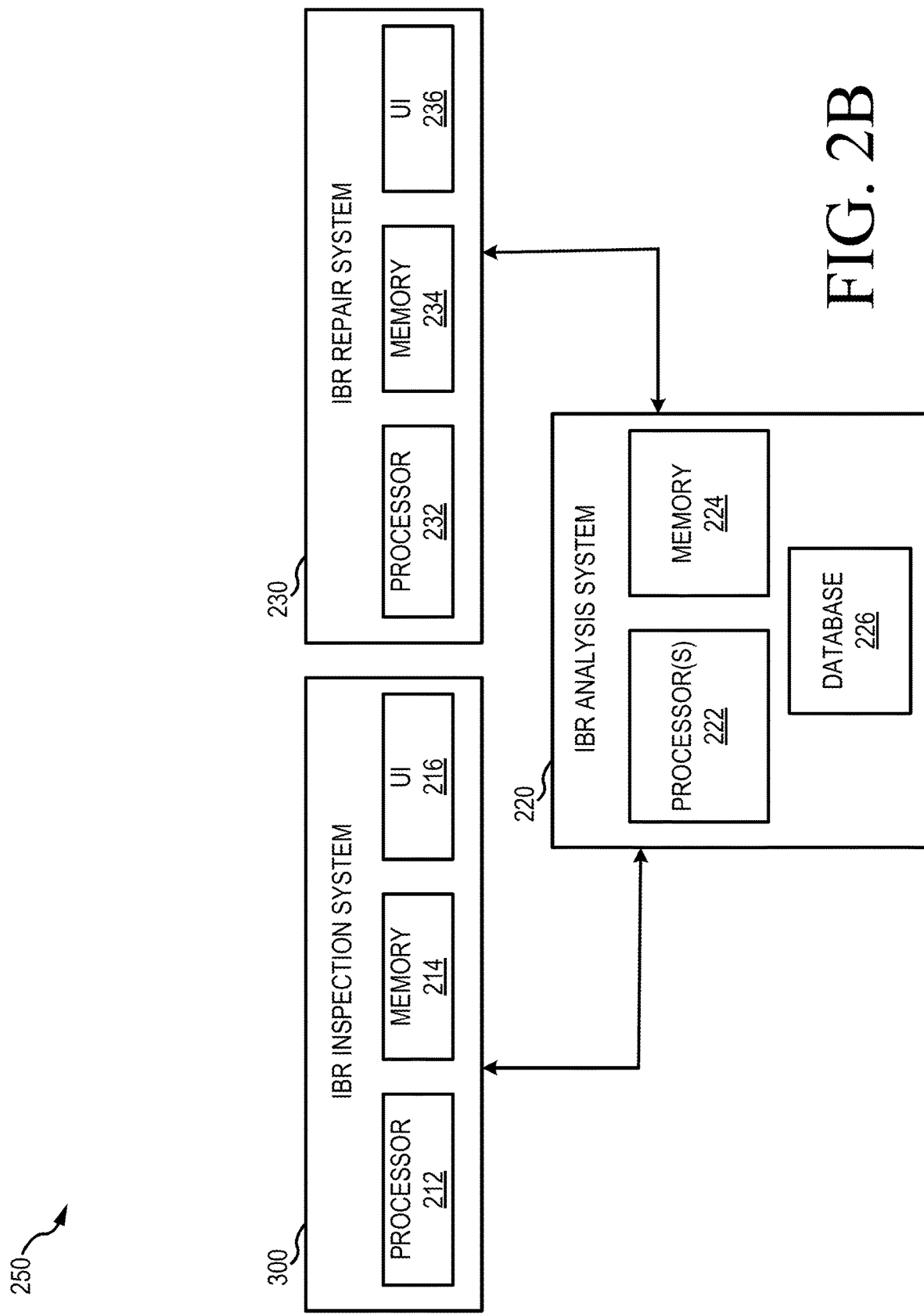
FIG. 2B illustrates a schematic view of a system for repairing an integrally bladed rotor, in accordance with various embodiments.

Referring now to FIG. 2B, a system 250 for repairing an IBR 100 is illustrated, in accordance with various embodiments. In various embodiments, the system 250 includes an IBR inspection system 300, an IBR analysis system 220, and an IBR repair system 230. Although illustrated as separate systems with separate processors (e.g., processors 212, 222, 232), the present disclosure is not limited in this regard. For example, the system 250 may include a single processor, a single memory, and a single user interface and still remain within the scope of this disclosure.

Similarly, although IBR inspection system 300 and IBR repair system 230 are illustrated as separate systems with separate processors, memories and user interfaces, the present disclosure is not limited in this regard. For example, the IBR inspection system 300 and the IBR repair system 230 may be combined into a single system that communicates with the IBR analysis system 220, in accordance with various embodiments.

In various embodiments, the IBR analysis system 220 may include one or more processors 222. In this regard, the IBR analysis system 220 may be configured to process a significant amount of data during the analysis step 204 from method 200. In this regard, the IBR analysis system 220 may be configured for remote computing (e.g., cloud-based computing), or the like. Thus, a processing time and a volume of data analyzed may be greatly increased relative to typical repair systems, in accordance with various embodiments.

In various embodiments, the IBR inspection system 300, the IBR analysis system 220, and the IBR repair system 230 each include a computer system comprising a processor (e.g., processor 212, processor(s) 222, and/or processor 232) and a memory (e.g., memory 214, memory 224, memory 234). The IBR inspection system 300 and the IBR repair system 230 may each comprise a user interface (UI) (e.g., UI 216, UI236). In various embodiments, the IBR inspection system 201 and the IBR repair system 230 may utilize a single user interface to control both systems. The present disclosure is not limited in this regard.

The IBR analysis system 220 may further comprise a database 226. In various embodiments, the database 226 comprises various stored data for use in the IBR analysis system 220. The database 226 may include an inspected IBR database (e.g., with data from various prior inspected IBRs), a repair data database (e.g., with data from various prior repairs performed/approved), a load data database (e.g., with engine load data from structural and/or aerodynamic analysis), a test data database (e.g., with engine specific test data used for validation of structural and/or aerodynamic analysis), a design data database (e.g., with design models having nominal dimensions according to a product definition of the IBR 100), and/or a material data database (e.g., with material for each component utilized in an analysis step 204 of method 200), in accordance with various embodiments.

System 250 may be configured for inspecting (e.g., step 202 of method 200), analyzing (e.g., step 204 of method 200), and repairing (e.g., step 206 of method 200) an IBR 100, in accordance with various embodiments. In this regard, a repair process for an IBR 100 may be fully automated, or nearly fully automated, in accordance with various embodiments, as described further herein.

In various embodiments, and as shown in FIG. 1, systems 300, 220, 230 may each store a software program configured to perform the methods described herein in a respective memory 214, 224, 234 and run the software program using the respective processor 212, 222, 232. The systems 300, 220, 230 may include any number of individual processors 212, 222, 232 and memories 214, 224, 234. Various data may be communicated between the systems 300, 220, 230 and a user via the user interfaces (e.g., UI 216, UI 236). Such information may also be communicated between the systems 300, 220, 230 and external devices, database 226, and/or any other computing device connected to the systems 300, 220, 230 (e.g., through any network such as a local area network (LAN), or wide area network (WAN) such as the Internet).

In various embodiments, systems 300, 220, 230 depicted in FIG. 2B, each processor 212, 222, 232 may retrieve and executes instructions stored in the respective memory 214, 224, 234 to control the operation of the respective system 300, 220, 230. Any number and type of processor(s) (e.g., an integrated circuit microprocessor, microcontroller, and/or digital signal processor (DSP)), can be used in conjunction with the various embodiments. The processor 212, 222, 232 may include, and/or operate in conjunction with, any other suitable components and features, such as comparators, analog-to-digital converters (ADCs), and/or digital-to-analog converters (DACs). Functionality of various embodiments may also be implemented through various hardware components storing machine-readable instructions, such as application-specific integrated circuits (ASICs), field-programmable gate arrays (FPGAs) and/or complex programmable logic devices (CPLDs).

The memory 214, 224, 234 may include a non-transitory computer-readable medium (such as on a CD-ROM, DVD-ROM, hard drive or FLASH memory) storing computer-readable instructions stored thereon that can be executed by the processor 212, 222, 232 to perform the methods of the present disclosure. The memory 144 may include any combination of different memory storage devices, such as hard drives, random access memory (RAM), read only memory (ROM), FLASH memory, or any other type of volatile and/or nonvolatile memory.

The system 300, 230 may receive and display information via a respective user interface (e.g., UI 216 and/or UI 236). The user interfaces (e.g., UI 216 and/or UI 236) include various peripheral output devices (such as monitors and printers), as well as any suitable input or control devices (such as a mouse and keyboard) to allow users to control and interact with the software program.

In various embodiments, IBR inspection system 300 and IBR repair system 230 may each be in electronic communication with IBR analysis system 220, directly or via a respective user interface (e.g., UI 216 and/or UI 236). IBR inspection system 300 and IBR repair system 230 may comprise any suitable hardware, software, and/or database components capable of sending, receiving, and storing data. For example, IBR inspection system 300 and/or IBR repair system 230 may comprise a personal computer, personal digital assistant, cellular phone, smartphone (e.g., those running UNIX-based and/or Linux-based operating systems such as IPHONE®, ANDROID®, and/or the like), IoT device, kiosk, and/or the like. IBR inspection system 300 and/or IBR repair system 230 may comprise an operating system, such as, for example, a WINDOWS® mobile operating system, an ANDROID® operating system, APPLE® IOS®, a LINUX® operating system, and the like. IBR inspection system 300 and/or IBR repair system 230 may also comprise software components installed on IBR inspection system 300 and/or IBR repair system 230 and configured to enable access to various system 250 components. For example, IBR inspection system 300 and/or IBR repair system 230 may comprise a web browser (e.g., MICROSOFT INTERNET EXPLORER®, GOOGLE CHROME®, APPLE SAFARI® etc.), an application, a micro-app or mobile application, or the like, configured to allow the IBR inspection system 300 and/or IBR repair system 230 to access and interact with IBR analysis system 220 (e.g., directly or via a respective UI, as discussed further herein).

Figure 3:
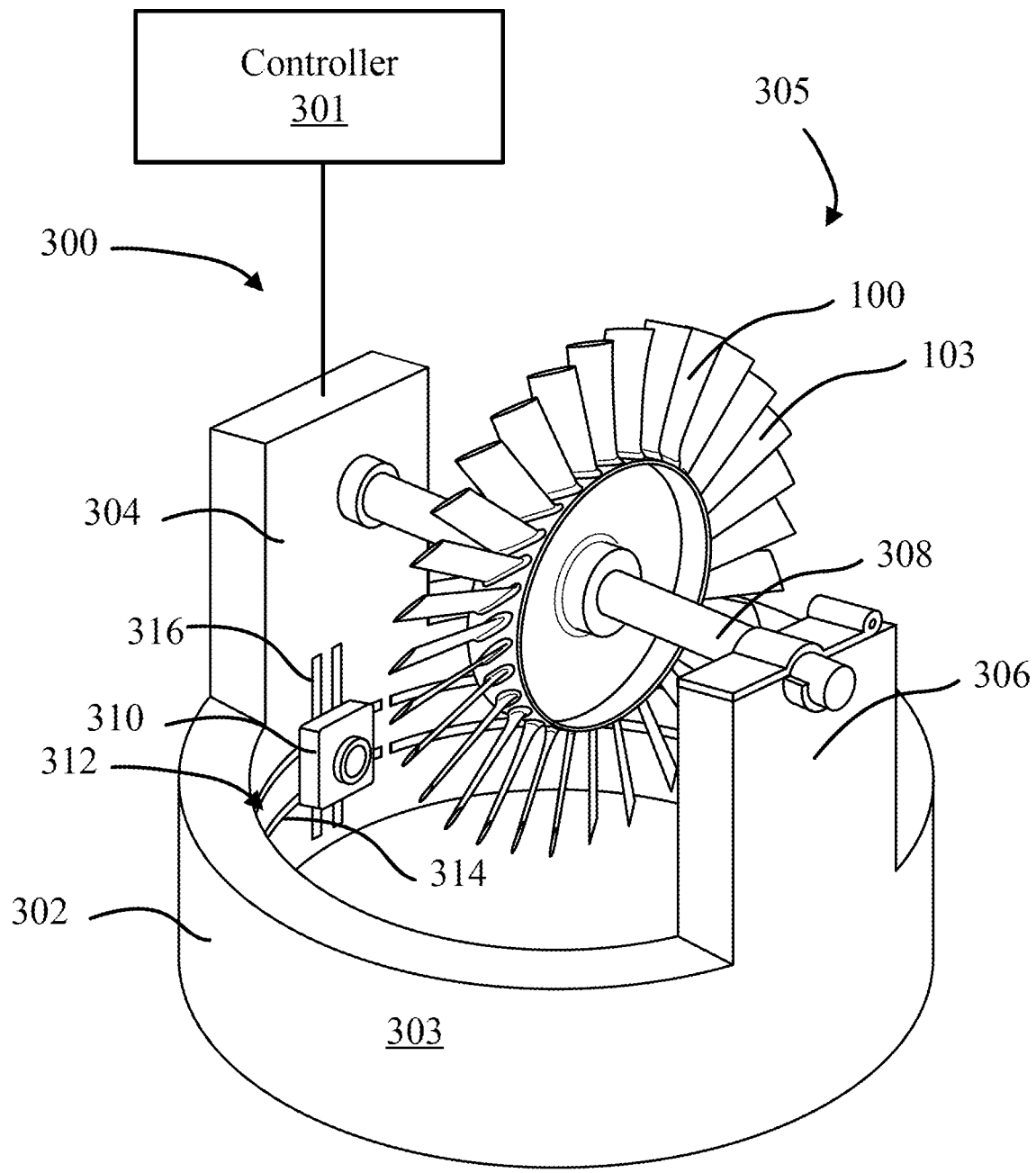
FIG. 3 illustrates a perspective view of a bladed rotor inspection system, in accordance with various embodiments.
Figure 4:
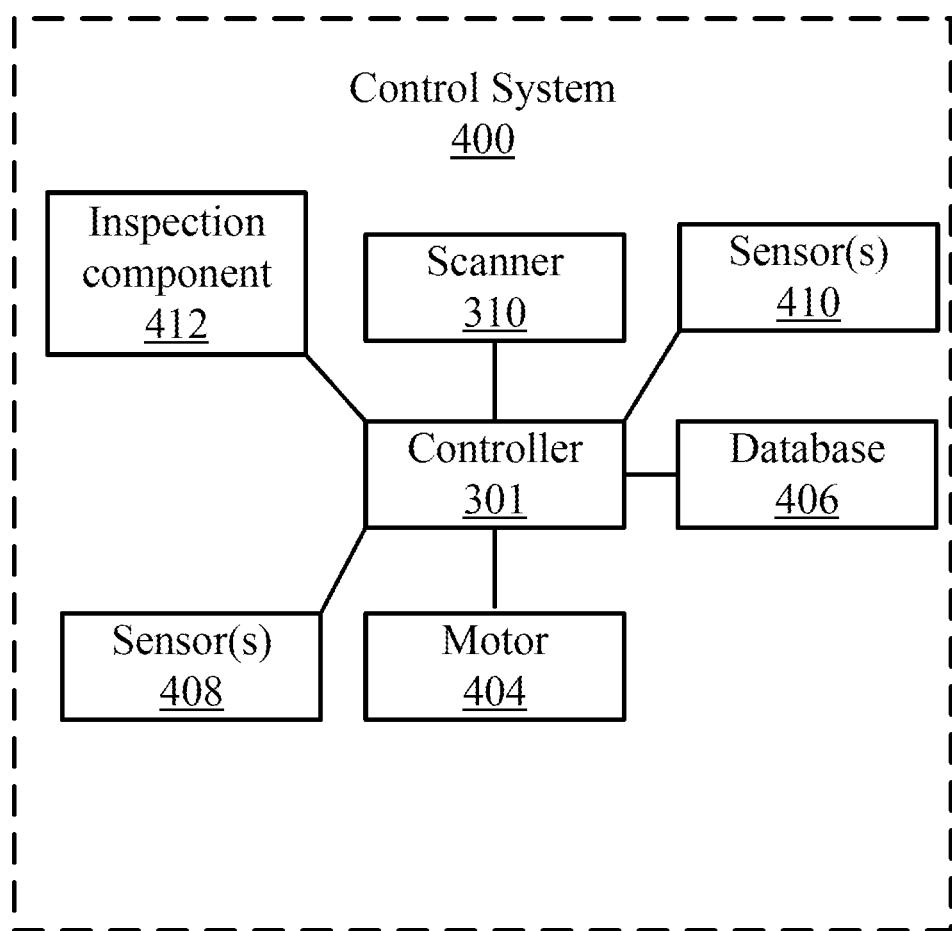
FIG. 4 illustrates a schematic view of a control system for a bladed rotor inspection system, in accordance with various embodiments.

Referring now to FIGS. 3 and 4, a perspective view of an inspection system 300 for use in an inspection step 202 of method 200 from FIG. 2 and a control system 400 for the inspection system 300 (FIG. 4) are illustrated in accordance with various embodiments. In various embodiments, the inspection system 300 comprises a controller 301, a support structure 302, a shaft 308, and a scanner 310. In various embodiments, the control system 400 comprises the controller 301, the scanner 310, a memory 402, a motor 404, a database 406, and sensor(s) 408, sensor(s) 410, and inspection component 412. In various embodiments, the inspection system 300 comprises a bladed rotor inspection device 305.

In various embodiments, the support structure 302 comprises a base 303, a first vertical support 304, a second vertical support 306. In various embodiments, the base 303 may be annular in shape. Although illustrated as being annular, the present disclosure is not limited in this regard. For example, the base 303 may be semi-annular in shape, a flat plate, or the like. In various embodiments, the vertical supports 304, 306 extend vertically upward from the base 303 on opposite sides of the base (e.g., 180 degrees apart, or opposite sides if the base 303 where a square plate). The shaft 308 extends from the first vertical support 304 to the second vertical support 306. The shaft 308 may be rotatably coupled to the motor 404, which may be disposed within the first vertical support 304, in accordance with various embodiments. The shaft 308 may be restrained vertically and horizontally at the second vertical support 306 but free to rotate relative to the second vertical support about a central longitudinal axis of the shaft 308. In various embodiments, a bearing assembly may be coupled to the second vertical support 306 to facilitate rotation of the shaft, in accordance with various embodiments.

In various embodiments, the IBR 100 to be inspected in accordance with the inspection step 202 of the method 200 via the inspection system 300 may be coupled to the shaft 308 (e.g., via a rigid coupling, or the like). The present disclosure is not limited in this regard, and the shaft 308 may be coupled to the IBR 100 to be inspected by any method known in the art and be within the scope of this disclosure.

In various embodiments, the scanner 310 is operably coupled to a track system 312. In various embodiments, the track system 312 may comprise a curved track 314 and a vertical track 316. The vertical track 316 may slidingly coupled to the vertical track 316 (e.g., via rollers or the like). The scanner 310 may be slidingly coupled to the vertical track 316 (e.g., via a conveyor belt, linkages or the like). In various embodiments, the scanner 310 is configured to extend from the track system 312 towards the IBR 100 during inspection of the IBR 100 in accordance with step 202 of method 200. In this regard, the inspection system 300 may further comprise a robot arm, an actuator or the like. Although described herein with tracks 314, 316, and a robot arm or actuator, the present disclosure is not limited in this regard. For example, any electronically controlled (e.g., wireless or wired) component configured to move the scanner 310 in six degrees of freedom relative to the IBR 100 is within the scope of this disclosure. In various embodiments, the inspection component 412 comprises rollers for the curved track, a conveyor belt for the vertical track, and/or a robotic arm coupled to the scanner 310. In various embodiments, the inspection component 412 comprises only a robotic arm. In various embodiments, the inspection component 412 comprises only the rollers for the curved track 314 and the conveyor belt or linkages for the vertical track 316. The present disclosure is not limited in this regard. In various embodiments, the inspection component 412 is stationary and the IBR 100 being inspected is moveable along three-axis, five-axis, or the like. The present disclosure is not limited in this regard.

In various embodiments, the scanner 310 comprises a coordinate measuring machine (CMM), a mechanical scanner, a laser scanner, a structured scanner (e.g., a white light scanner, a blue light scanner, etc.), a non-structured optical scanner, a non-visual scanner (e.g., computed tomography), or the like. In various embodiments, the scanner 310 is a blue light scanner. In various embodiments, the scanner 310 may be swapped with another scanner at any point during an inspection step 202 as described further herein. In various embodiments, the inspection system 300 may be configured to swap the scanner 310 with a different scanner during the inspection step 202 of method 200 as described further herein.

A "blue light scanner" as disclosed herein refers to a non-contact structure light scanner. The blue light scanner may have a scan range of between 100×75 mm$^2$-400×300 mm$^2$, in accordance with various embodiments. In various embodiments, an accuracy of the blue light scanner may be between 0.005 and 0.015 mm. In various embodiments, the blue light scanner be able to determine distances between adjacent points in the point cloud of between 0.04 and 0.16 mm as measured across three axes. In various embodiments, a volume accuracy of the blue light scanner may be approximately 0.8 mm/m. In various embodiments, a scan depth may be between approximately 100 and 400 mm. In various embodiments, the blue light scanner may comprise a light source including a blue LED. In this regard, the blue light scanner may be configured to emit an average wavelength between 400 and 450 nm, in accordance with various embodiments. Although described with various specifications herein, the blue light scanner is not limited in this regard, and one skilled in the art may recognize the parameters of the blue light scanner may extend outside the exemplary ranges. Use of a blue light scanner provides a high resolution point cloud for a three dimensional object.

The controller 301 may be integrated into computer system of the inspection system 300 (e.g., in processor 212 and/or memory 214 from FIG. 2B). In various embodiments, the controller 301 may be configured as a central network element or hub to various systems and components of the control system 400. In various embodiments, controller 301 may comprise a processor (e.g., processor 212). In various embodiments, controller 301 may be implemented as a single controller (e.g., via a single processor 212 and associated memory 214). In various embodiments, controller 301 may be implemented as multiple processors (e.g., a main processor and local processors for various components). The controller 301 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 301 may comprise a processor configured to implement various logical operations in response to execution of instructions, for example, instructions stored on a non-transitory, tangible, computer-readable medium configured to communicate with the controller 301.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re *Nuijten* to fall outside the scope of patentable subject matter under 35 U.S.C. § 101.

In various embodiments, the motor 404 of the control system 400 is operably coupled to the shaft 308 of the control system 400. In various embodiments, the motor 404 may comprise a direct current (DC) stepper, an alternating current (AC) motor or the like. The present disclosure is not limited in this regard. In various embodiments, the sensor(s) 408 include Hall effect sensor(s), optical sensor(s), resolver(s), or the like. In various embodiments, sensor(s) 408 may include sensor(s) configured to detect an angular position of the shaft 308 during an inspection step for an IBR 100 (e.g., step 202 from method 200). In this regard, during inspection of the IBR 100, the controller 301 receives sensor data from the sensor(s) 408. The controller 301 can utilize the sensor data received from the sensor(s) 408 to correlate an angular position of the IBR 100 being inspected with a location of the scanner 310 as described further herein. In various embodiments, in an application with a robot arm, the IBR 100 may remain stationary throughout an inspection process (e.g., inspection step 202 of method 200). Thus, coordinates of the robotic arm may be determined via sensor(s) 408 in a similar manner to orient and construct the IBR 100 being inspected as described further herein.

In various embodiments, the sensor(s) 410 are configured to detect a position of the scanner 310 during the inspection step 202 of method 200. In this regard, sensor(s) 410 may be position sensors (e.g., capacitive displacement sensors, eddy-current sensors, Hall effect sensors, inductive sensors, optical sensors, linear variable differential transformer (LVDT) sensors, photodiode array sensors, piezoelectric sensors, encoders, potentiometer sensors, ultrasonic sensors or the like). The present disclosure is not limited in this regard. Thus, during inspection of the IBR 100 in accordance with step 202 of method 200, controller 301 is able to determine a location of the scanner 310 and an angular position of the IBR 100 throughout the inspection. Thus, based on the location of the scanner 310, an angular location of the IBR 100 and scanning data received from the scanner 310, a digital map (e.g., a robust point cloud) can be generated during the inspection step 202 of method 200 for the IBR 100 being inspected. In various embodiments, the point cloud encompasses the entire IBR 100 (e.g., between 95% and 100% of a surface area of the IBR 100, or between 99% and 100% of the surface area of the IBR 100).

Figure 5:
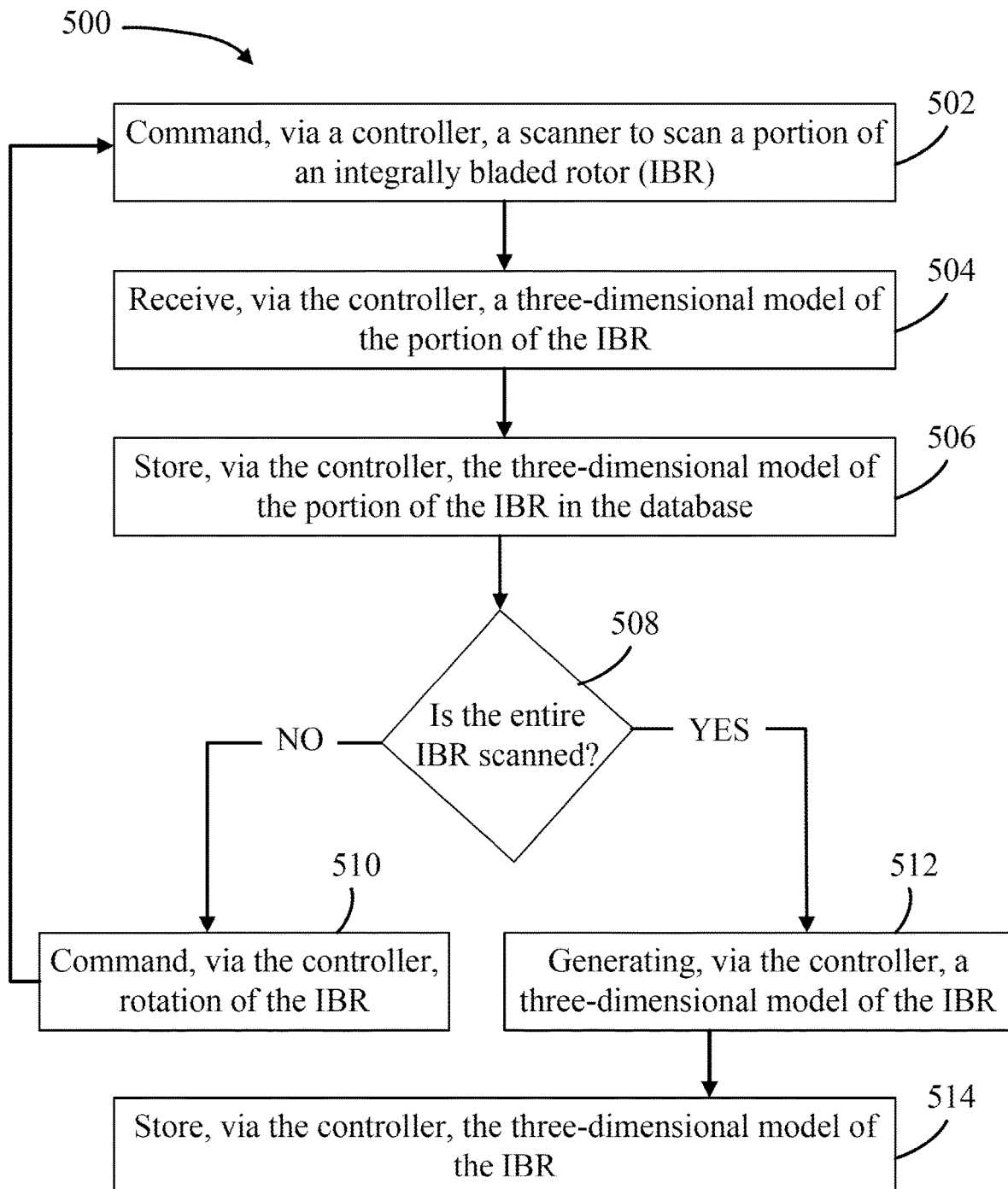
FIG. 5 illustrates a process performed by a control system for a bladed rotor inspection system, in accordance with various embodiments.

Referring now to FIG. 5, a process 500 for inspecting an IBR 100 that is performed by the control system 400 of the inspection system 300 is illustrated, in accordance with various embodiments. In various embodiments, the process 500 comprises commanding, via a controller 301, a scanner to scan a portion of the IBR 100 (step 502). In various embodiments, the portion of the IBR 100 may comprise a blade 101 or the like. In various embodiments, a root, a platform, or the like of the IBR 100 may be the portion. The present disclosure is not limited in this regard. In various embodiments, the root and the platform of the IBR 100 may be scanned along with the blade 101. In various embodiments, multiple blades 101 may be scanned with the portion of the IBR 100.

In various embodiments, commanding the scanner 310 in step 502 may further comprise commanding rollers of the curved track 314, commanding a conveyor belt or linkages of the vertical track 316 or the like in conjunction with scanning via the scanner 310. In this regard, the controller 301 may provide a predetermined path for the scanner 310 to scan the portion of the IBR 100, in accordance with various embodiments. However, the present disclosure is not limited in this regard, for example, step 502 may include commanding a scanner coupled to a robotic arm (e.g., robotic arm 1210 in FIG. 12) to scan a portion of the IBR 100, or may include commanding a five-axis system (e.g., system 1300 from FIG. 13) to orient the IBR 100 for scanning, or the like. Thus, step 502 may include any command to position the IBR 100 being inspected relative to a scanner and scanning the portion of the IBR 100, in accordance with various embodiments.

The process 500 further comprises receiving, via the controller, a three-dimensional model of the first portion of the IBR 100 (step 504). In various embodiments, the three-dimensional model is a digital map (e.g., a point cloud). In this regard, in response to utilizing a CMM scanner or a structured light scanner, the scanner 310 measures discrete points of surfaces of the portion of the IBR being scanned and transmits the discrete points to the controller 301. In various embodiments, the point cloud may be relative to a datum defined by the inspection system 300. For example, the shaft 308 may be configured to couple to the IBR 100 being inspected in exactly the same place every time. In this regard, a datum for the inspection system 300 may be defined in the memory (e.g., memory 214). In various embodiments, the datum is a center point of the IBR 100 (e.g., a center point of the disk of the IBR 100). Thus, the controller 301 is configured to determine a location of each point scanned via the scanner 310 based on the datum, a location of the scanner 310 when a scan occurs during step 502 from sensor(s) 410, measurement data from the scanner 310, and an angular position of the IBR 100 from sensor(s) 408.

The process 500 further comprises storing, via the controller 301, the three-dimensional model in a database 406 (step 506). Although described herein as intermittently storing scanned portions of the IBR 100, the present disclosure is not limited in this regard. For example, the scanner 310 may scan the entire IBR prior to transmitting the three-dimensional model to the controller 301 and still be within the scope of this disclosure. In this regard, the controller 301 may be configured to determine an amount of the IBR 100 that has been scanned based on the angular position of the IBR 100 and the position of the scanner 310 throughout step 502.

The process 500 further comprises determining whether the IBR has been scanned in its entirety (e.g., between 95% and 100% or between 99% and 100% or approximately 100%). In this regard, the process 500 may determine whether the scanner 310 has performed a scan at each predetermined arc angle (e.g., 1 degree, 3 degrees, 5 degrees, or the like) and a total angular rotation of the IBR 100 for the scanning process has reached 360 degrees.

If the entire IBR has not been scanned, the process 500 further comprises commanding, via the controller 301, rotation of the IBR 100 a fixed amount (e.g., 1 degree, 3 degrees, 5 degrees, 10 degrees, etc.). The present disclosure is not limited in this regard. The controller 301 may command the motor 404 to rotate the IBR 100 the fixed amount, in accordance with various embodiments.

In various embodiments, steps 502, 504, 506, 508 are repeated until the entire IBR is scanned according to step 508, at which point the process 500 further comprises generating, via the controller 301, a three-dimensional model of the IBR 100 (step 512). In this regard, in response to the scanner 310 being a CMM scanner or a structured light scanner, the controller 301 may stitch together the point clouds for each portion of the IBR scanned via step 502 to generate a robust point cloud of the entire IBR 100 (e.g., between 95% and 100% of an external surface area of the IBR 100, or between 99% and 100% of the external surface area of the IBR 100, or approximately 100% of the external surface area of the IBR 100). In various embodiments, the entire IBR 100 refers to approximately 100% of an external surface area of all the blades of the IBR 100.

In various embodiments, the process 500 further comprises storing, via the controller 301, the three-dimensional model of the IBR in the database 406. In this regard, the three-dimensional model may be utilized for analyzing the inspected IBR (e.g., in accordance with step 204 of method 200), determining a repair for the inspected IBR (e.g., based on step 204 of method 200) and/or in repairing the inspected IBR (e.g., in accordance with step 206 of method 200).

In various embodiments, the process 500 may provide a fully automated solution for generating a robust three-dimensional model (e.g., a point cloud) for an inspected IBR 100, in accordance with various embodiments.

Figure 6:
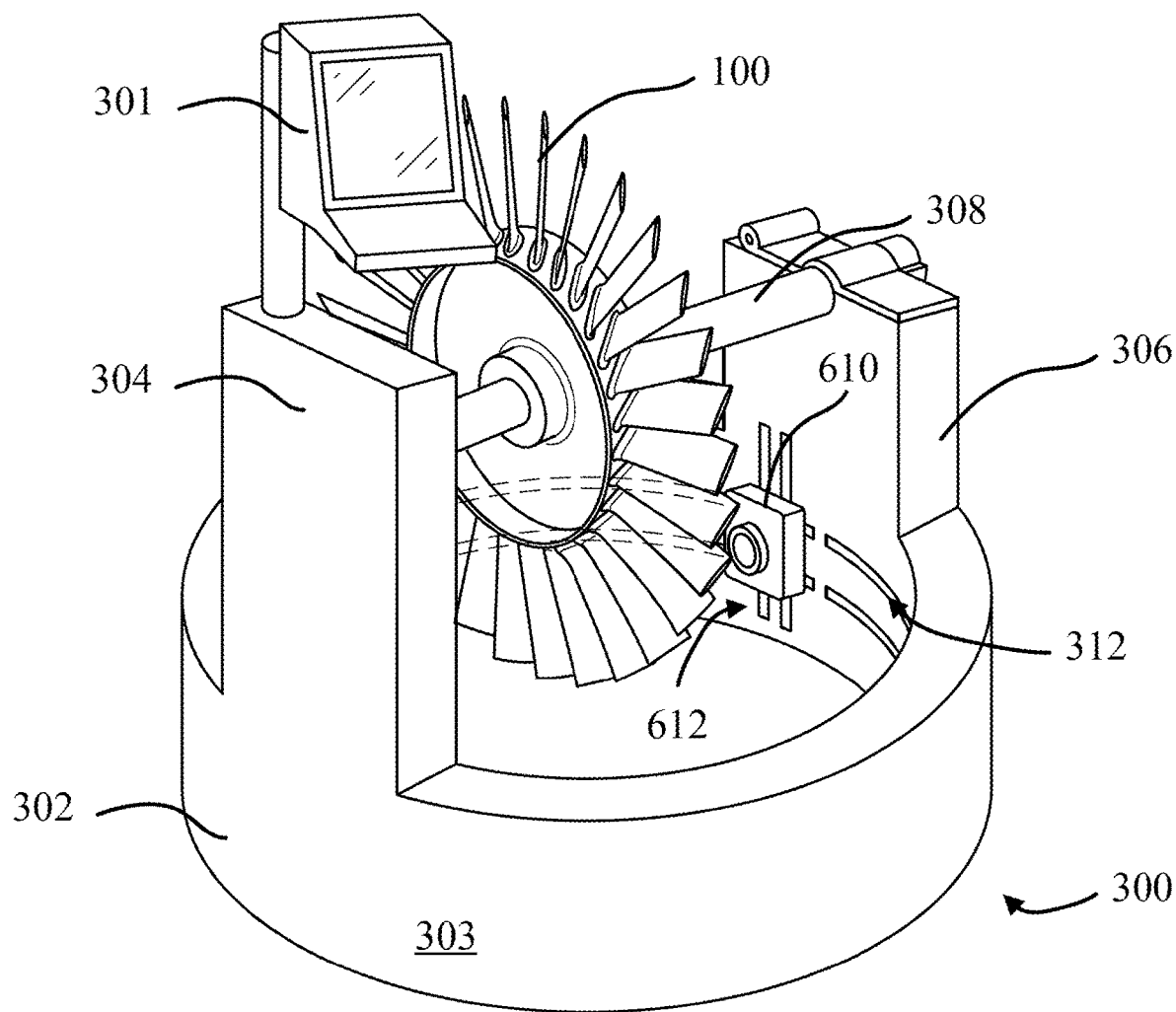
FIG. 6 illustrates a perspective view of a bladed rotor inspection system, in accordance with various embodiments.

Referring now to FIG. 6, a perspective view of the inspection system 300 from FIG. 3 is illustrated, in accordance with various embodiments, with like numerals depicting like elements. In various embodiments, the inspection system 300 further comprises a second scanner 610. In various embodiments, the second scanner 610 may be in accordance with scanner 310 as described further herein. In various embodiments, the second scanner 610 is a different scanner than scanner 310 as described further herein. In various embodiments, the second scanner 610 is coupled to a second track system 612. The track system 612 may be in accordance with the track system 312, in accordance with various embodiments. In various embodiments the track system 612 is independent (i.e., not connected to), the track system 312. In this regard, an end of first track system 312 may be spaced apart from an end of the second track system 612, in accordance with various embodiments. As described further herein, the second scanner 610 may be configured for simultaneous scanning of the IBR 100 with the first scanner 310 (i.e., at a different portion), configured for scanning in response to determinations by the controller 301 based on scanning data received from the first scanner 310, or the like.

Figure 7:
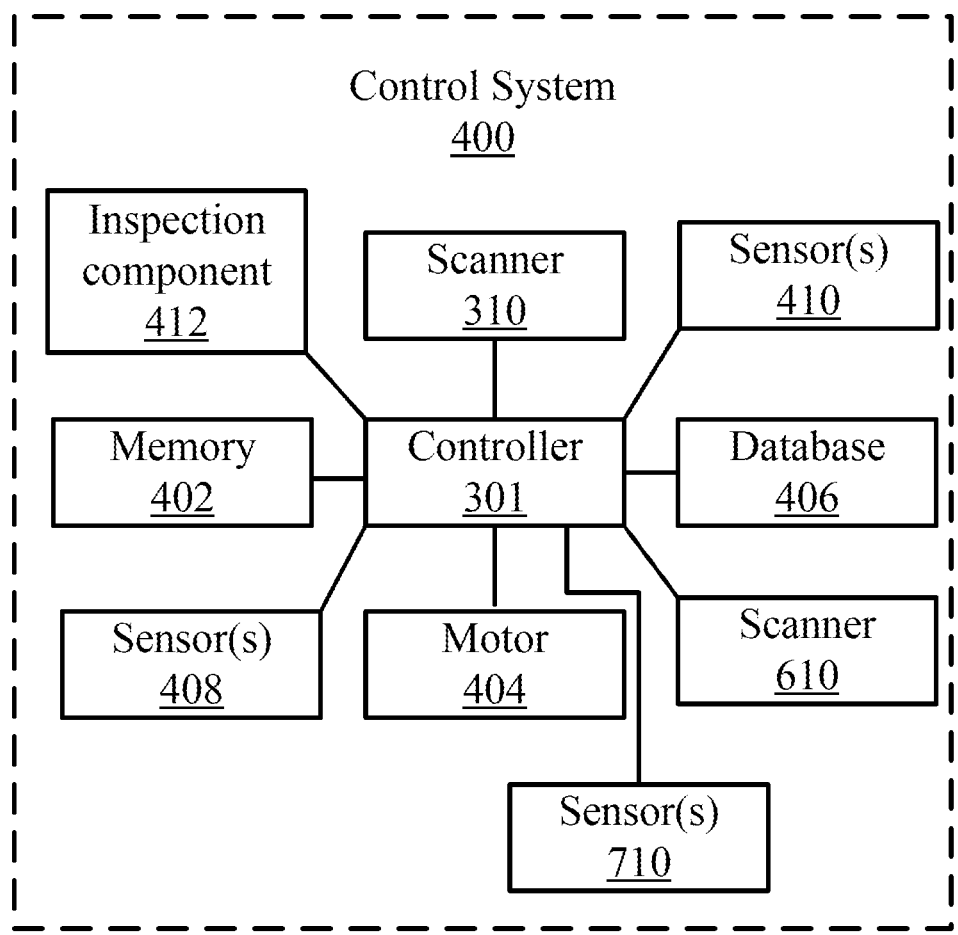
FIG. 7 illustrates a schematic view of a control system for a bladed rotor inspection system, in accordance with various embodiments.

Referring now to FIG. 7, a schematic view of the control system 400 for the inspection system 300 is illustrated, in accordance with various embodiments, with like numerals depicting like elements. In various embodiments, the control system 400 further comprises the second scanner 610 and sensor(s) 710. Sensor(s) 710 may be in accordance with sensor(s) 410 described previously herein. In this regard, the sensor(s) 710 are configured to detect a location of the second sensor 710 to transmit to the controller for defining the three-dimensional model (e.g., a point cloud) as described previously herein.

Figure 8:
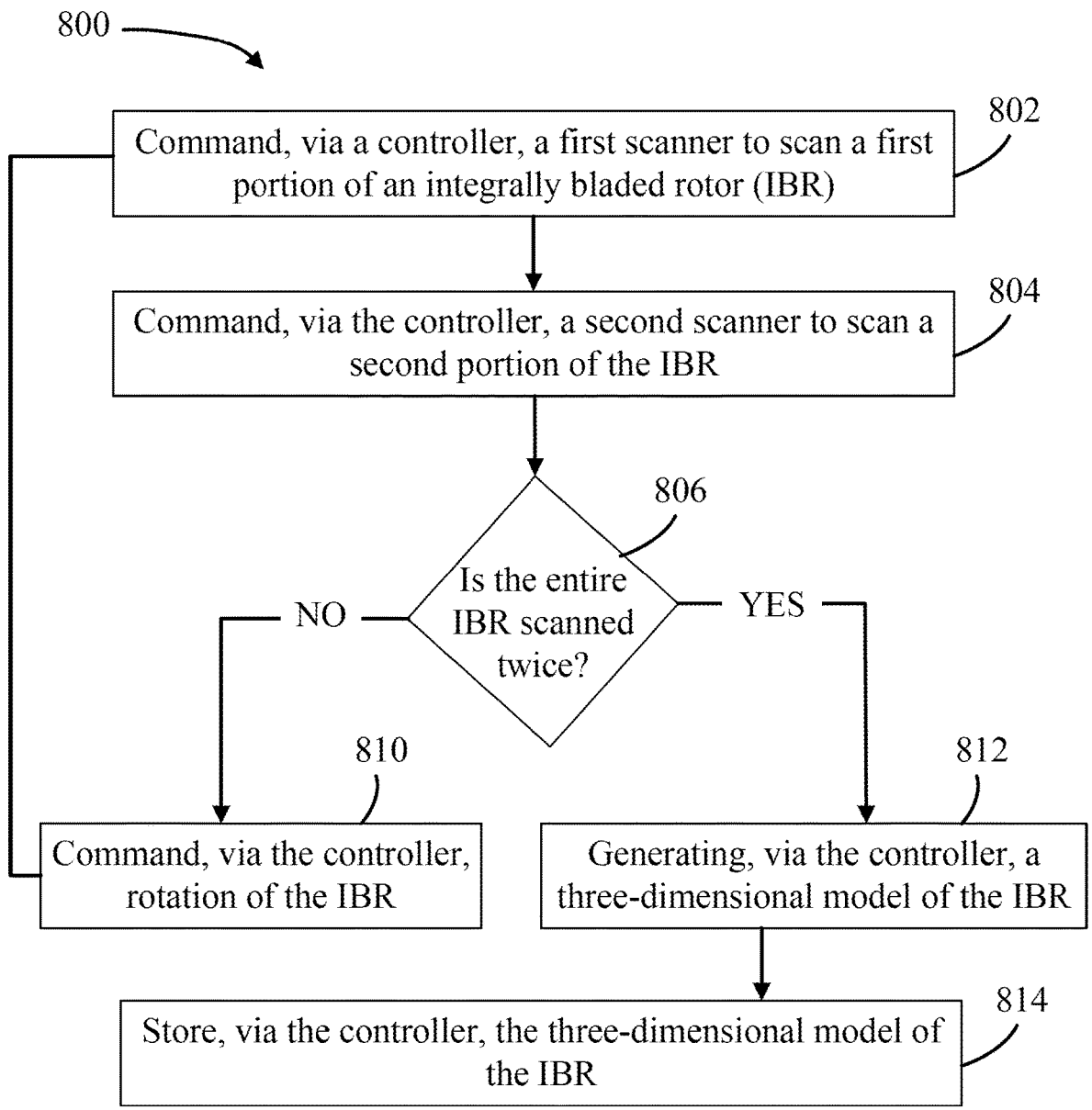
FIG. 8 illustrates a process performed by a control system for a bladed rotor inspection system, in accordance with various embodiments.

Referring now to FIG. 8, a process 800 for inspecting an IBR 100 that is performed by the control system 400 (from FIG. 7) of the inspection system 300 (from FIG. 6) is illustrated, in accordance with various embodiments. The process 800 comprises commanding, via a controller 301, a first scanner 310 to scan a first portion of an integrally bladed rotor (IBR) (step 802), and commanding, via the controller, a second scanner to scan a second portion of the IBR (step 804). In this regard, the scanners 310, 610 may be utilized simultaneously on distinct portions of the IBR, in accordance with various embodiments. In this regard, a single scan of the entire IBR may be halved in accordance with various embodiments. In various embodiments, utilizing two scanners (e.g., scanners 310, 610) may be used to enhance a fidelity (i.e., a point density) of the scan.

In this regard, in various embodiments, the process 800 further comprises determining whether the IBR has been scanned twice (step 806). For example, in a similar manner to process 500, the controller 301 may track an angular position of the IBR 100 throughout process 800. In response to the angular position reaching 360 degrees from an initial position, the controller 301 can determine that the IBR 100 has been scanned twice (i.e., an entire external surface area of the IBR 100 would be scanned by both the first scanner 310 and the second scanner 610).

In various embodiments, in response to the controller 301 determining the IBR 100 has not been scanned twice in step 806, the controller 301 may command rotation of the IBR in accordance with step 510 of process 500 described previously herein and revert back to step 802. In various embodiments, in response to determining the IBR 100 has been scanned twice in step 806, the process 800 may further comprise generating, via the controller, a three-dimensional model of the IBR (step 812).

In various embodiments, the three-dimensional model is a point cloud having a point density of approximately double that of a point density generated from process 500 (i.e., twice as many discrete points for the point cloud). In this regard, a higher fidelity scan of the IBR 100 may be achieved relative to process 500 in a similar amount of time. Although illustrated as being performed with two scanners (e.g., scanners 310, 610), the present disclosure is not limited in this regard. In various embodiments, generating the three-dimensional model of step 812 may include stitching together a first point cloud from the first scan with a second point cloud of the second scan. In this regard, the first scan may be used as a reference for stitching together the second scan, datums determined from the first scan may be utilized for stitching together the second scan, or any other method of stitching together a first point cloud with a second point cloud may be performed.

For example, a single scanner 310 could be utilized, the controller could continue process 500 until the IBR travelled 720 degrees (i.e., two revolutions), and achieve a similar point cloud to process 800. However, with the single scanner, the process would take twice as much time. Yet, a system cost may be reduced relative to a two scanner configuration, in accordance with various embodiments.

In various embodiments, after generating the three-dimensional model in step 812, the three-dimensional model may be stored via the controller 301, in the database 406 in accordance with step 514 of process 500.

In various embodiments, IBR 100 may include sharp edges (e.g., leading edges, trailing edges, tips, etc.). Thus, proper, and accurate, tuning of the blades 103 is desirable. In various embodiments, scanners 310, 610 for the process 800 may both be structured light scanners, may be with a laser and a structured light scanner, or any other combination described previously herein. In this regard, a high-fidelity scan of the various sharp edges of the blades 103 for the IBR 100 being inspected may be achieved for use in analyzing in step 204 of method 200 and developing a repair process for the repair step 206 of method 200, in accordance with various embodiments.

Figure 9:
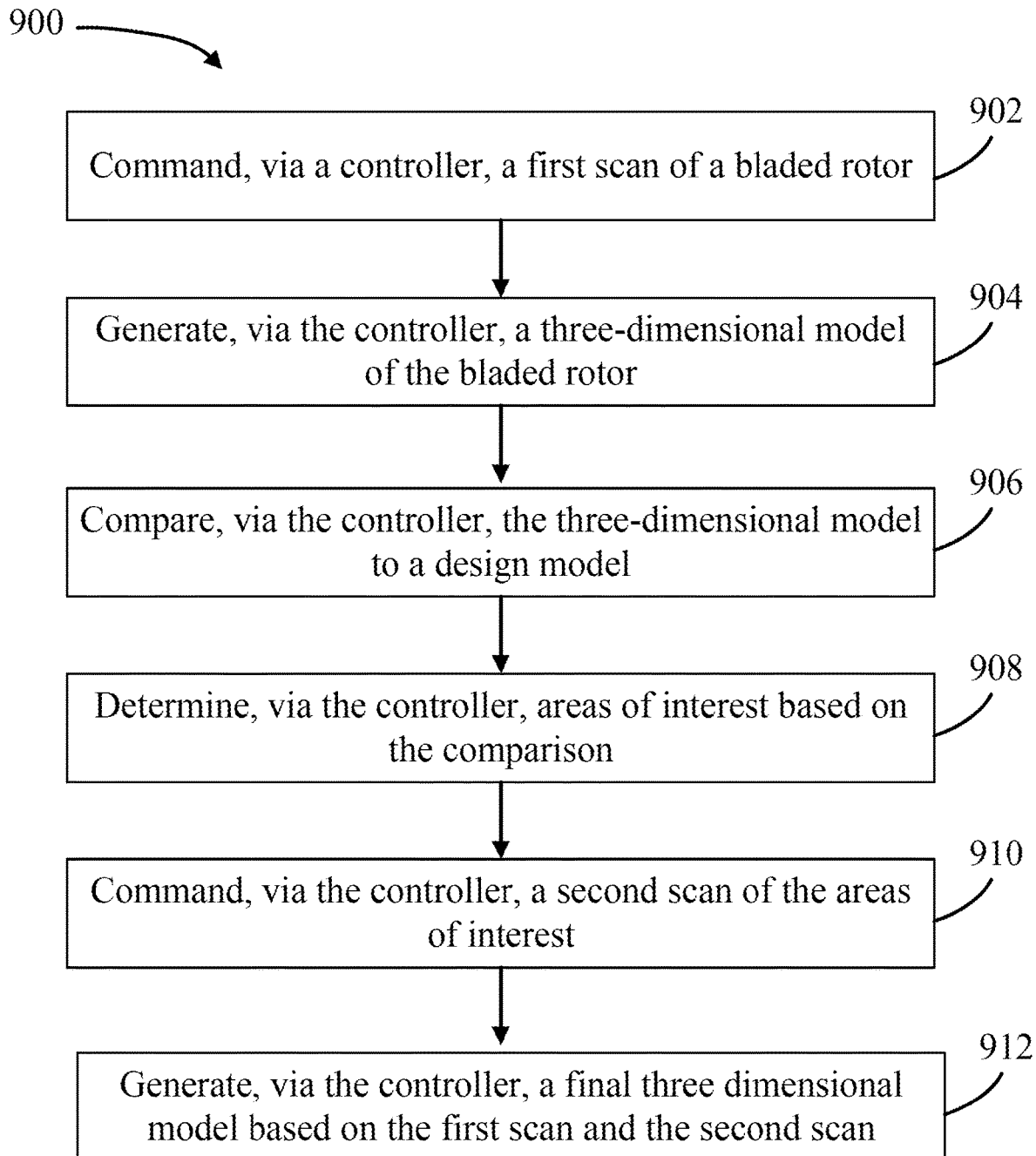
FIG. 9 illustrates a process performed by a control system for a bladed rotor inspection system, in accordance with various embodiments.

Referring now to FIG. 9, a process 900 for feedback driven scan configured to be performed by the control system 400 (e.g., FIG. 4 or FIG. 7) of the inspection system (e.g., FIG. 3 or FIG. 6), is illustrated, in accordance with various embodiments.

The process 900 comprises commanding, via the controller 301, a first scan of a bladed rotor (e.g., IBR 100) (step 902). The first scan of the bladed rotor may be in accordance with process 500 in accordance with various embodiments. In various embodiments, the first scan may be performed with a scanner configured to produce a quicker, lower density point cloud (e.g., a CMM). In this regard, the first scan of the bladed rotor may be considered a high-level initial scan of the bladed rotor, in accordance with various embodiments.

The process 900 further comprises generating, via the controller 301, a three-dimensional model (e.g., a point cloud) of the bladed rotor based on the first scan (step 904), and comparing, via the controller 301, the three-dimensional model to a design model for the bladed rotor being inspected (step 906). Although described herein with respect to comparing to a design model, the present disclosure is not limited in this regard. For example, the database 406 of the control system 400 may have various inspected bladed rotor point clouds stored therein. In various embodiments, the various inspected bladed rotors with point clouds in the database 406 may include designations (i.e., approved without repairs or the like). In this regard, the comparing step 906 may utilize previously approved inspected bladed rotor point clouds to compare the three-dimensional model generated from the first scan in step 904.

In various embodiments, the process 900 further comprises determining, via the controller 301, areas of interest on the bladed rotor based on the comparison in step 906 (step 908). Although described herein as the controller 301 determining the areas of interest, the present disclosure is not limited in this regard. For example, the controller 301 may be configured to transmit the digital data through an application based software infrastructure that stores data on remote servers and may be configured for determining areas of interests of the IBR 100 (i.e., via cloud-based computing or the like), in accordance with various embodiments. For example, with brief reference to FIG. 2B, the controller 301 may transmit the digital data to the IBR analysis system 220 (e.g., via a WAN such as the Internet), the IBR analysis system 220 may perform analysis based on the three-dimensional model generated from the first scan in step 902, and the IBR analysis system 220 may output areas of interest to the IBR inspection system 300, in accordance with various embodiments. In this regard, the controller 301 may receive, via the processor, areas of interest on the bladed rotor after transmitting the digital data to a cloud based computing software instead of performing steps 906 and 908 of process 900 and still be within the scope of this disclosure.

In various embodiments, the comparing and determining of steps 906, 908 of process 900 may be performed by manual processes. For example, fluorescent penetrant inspection (FPI) may be performed manually on the IBR 100. In response to performing the FPI, a person may determine areas of interest of the IBR and input coordinates of the respective areas of interest into the processor (e.g., via a graphical user interface (GUI) or the like). In this regard, the process 900 may include receiving, from a GUI, areas of interest for the IBR 100 based on performing FPI or any other manual inspection process, in accordance with various embodiments.

In this regard, based on the sensor data received from the first scan in step 902, and described previously herein with respect to process 500, the process 900 further comprises commanding, via the controller 301, a second scan of the areas of interest determined from step 908 (step 910). In various embodiments, the second scan may include multiple scans with the scanner used for the first scan (e.g., in response to the scanner 310 being a CMM and having only a single scanner configuration). In various embodiments, the second scan may be performed with a higher resolution scanner (e.g., a structured light scanner). In this regard, the first scanner 310 may comprise a CMM scanner configured to perform step 902 of process 900, and the second scanner 610 may comprise a structured light scanner configured to perform step 910 of process 900, or a structured light scanner with a more optimal focal length for a higher resolution image of a detailed area of the IBR. In various embodiments, the second scan may be performed after swapping out a first scanner with a second scanner (e.g., for an inspection system 300 with a single scanner configuration). In this regard, a CMM scanner used for step 902 may be swapped out with a structured light scanner prior to performing the second scan, in accordance with various embodiments. In various embodiments, the inspection system 300 may be configured to automatically swap the scanners (e.g., in a similar manner to a spindle of a Computer Numerical Control (CNC) machine swapping out one machining tool for another). The present disclosure is not limited in this regard.

In various embodiments, the areas of interest comprise areas that are outside a threshold tolerance of the respective comparison model (e.g., a design model or an approved inspected model). In various embodiments, based on determining a first blade has an area of interest from step 908, the controller 301 may identify adjacent blades to the first blade as areas of interest (e.g., immediately adjacent blades, blades that are within two blades from the first blade, or the like). In this regard, the adjacent blades may be held to tighter tolerances due to damage to the first blade, in accordance with various embodiments. Thus, the adjacent blades may receive an additional scan in step 910 as described further herein as a more dense point cloud for the adjacent blades May help facilitate a better repair disposition from the analyzing step 204 of method 200, in accordance with various embodiments.

In various embodiments, the process 900 further comprises generating, via the controller 301, a final three-dimensional model based on the first scan and the second scan (step 912). In this regard, a point density in the areas of interest may be significantly greater than a point density outside the areas of interest, in accordance with various embodiments. In various embodiments, the process 900 facilitates efficient scanning of bladed rotors with a focus on achieving high definition of potential problem areas (e.g., defects or the like). In this regard, by inputting the point cloud developed from process 900 into an IBR analysis system from step 204 of method 200, a margin of safety relative to any defect areas may be reduced, in accordance with various embodiments.

Figure 10:
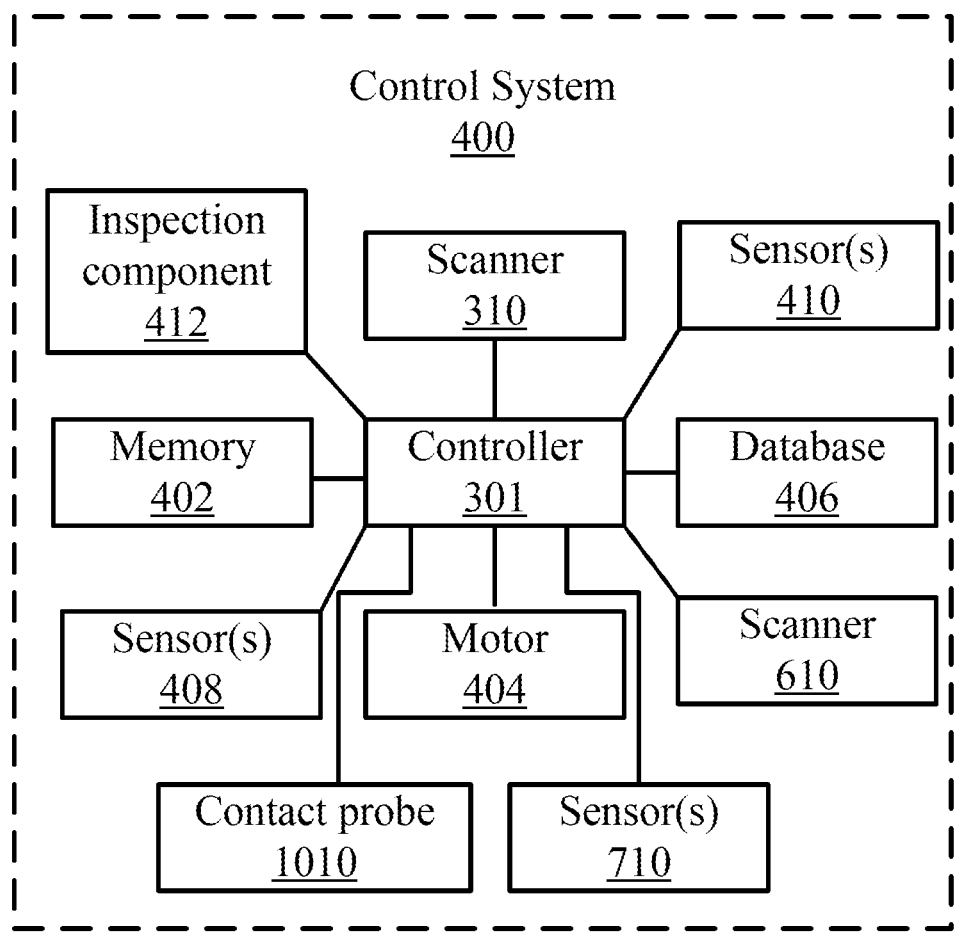
FIG. 10 illustrates a schematic view of a control system for a bladed rotor inspection system, in accordance with various embodiments.

Referring now to FIG. 10, a schematic view of the control system 400 for the inspection system 300 is illustrated, in accordance with various embodiments, with like numerals depicting like elements. In various embodiments, the control system 400 further comprises a contact probe 1010. In various embodiments, the contact probe 1010 may be kept to aside from the inspection system 300 when not in use (e.g., in a tool holder or the like). In various embodiments, in response to the inspection component 412 comprising a robotic arm (e.g., a six-axis robotic arm), the robotic arm may be configured to couple to the contact probe (i.e., in response to receiving instructions from the controller 301. In various embodiments, the contact probe 1010 may configured to electrically couple to the controller 301 in response to the robotic arm being coupled to the contact probe 1010. In various embodiments, the contact probe 1010 may be configured to electronically couple to the controller 301. The present disclosure is not limited in this regard.

In various embodiments, the contact probe 1010 is configured for non-destructive inspection (NDI). In this regard, any NDI probe is within the scope of this disclosure. For example, the contact probe 1010 may comprise an eddy current inspection (ECI) probe, an eddy current array (ECA) probe, a thermoacoustic (TAI) probe, or the like.

Figure 11:
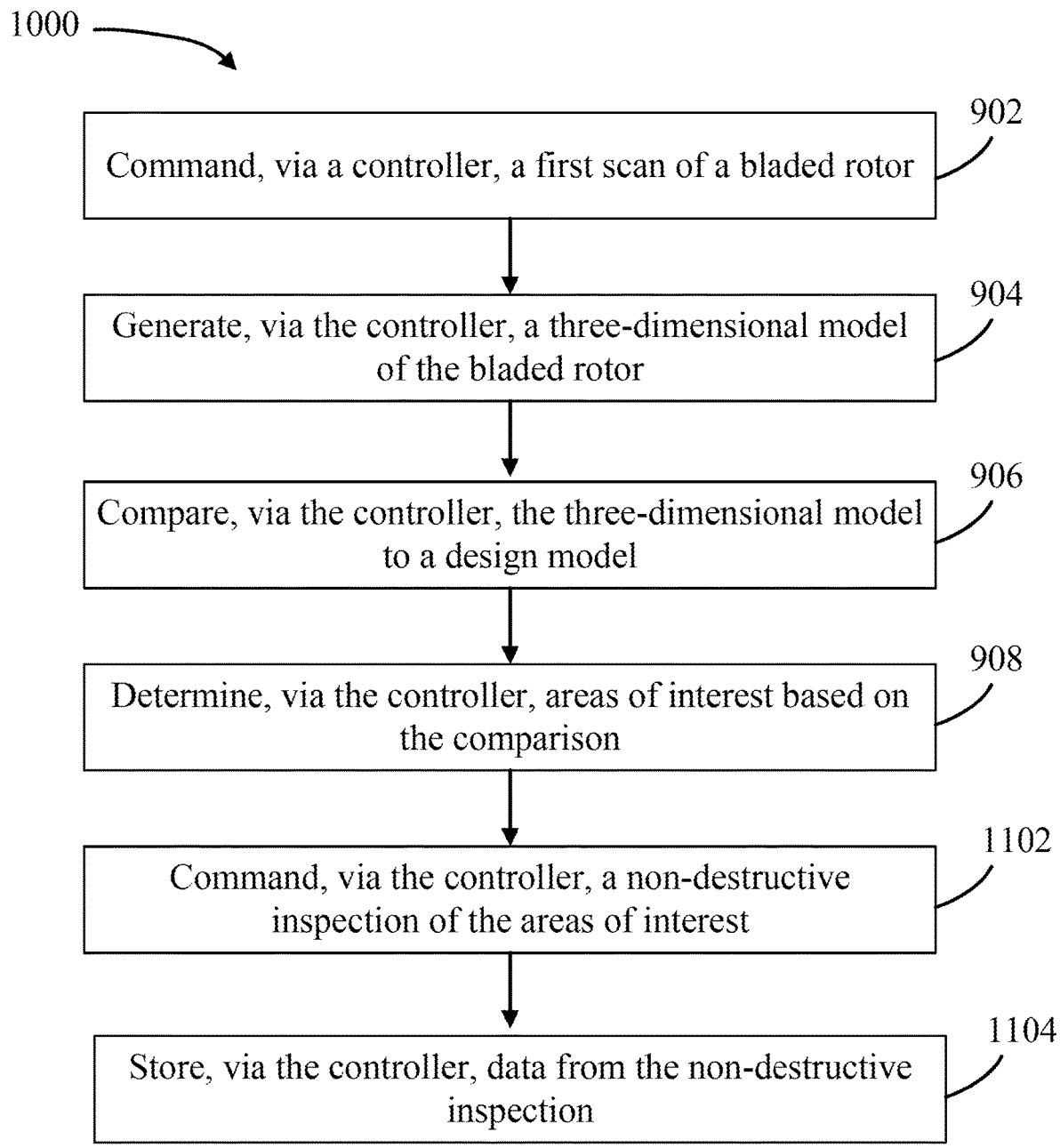
FIG. 11 illustrates a process performed by a control system for a bladed rotor inspection system, in accordance with various embodiments.

Referring now to FIG. 11, a process 1000 for inspecting bladed rotor that is performed by the control system 400 (from FIG. 10) of the inspection system 300 is illustrated, in accordance with various embodiments. In various embodiments, the process 1000 includes steps 902, 904, 906, and 908 of process 900.

The process 1000 further comprises commanding, via the controller 301, a non-destructive inspection of the areas of interest (step 1102). In this regard, the controller 301 may command the inspection component 412 (e.g., a robotic arm or the like) to couple to a contact probe 1010. In response to coupling the inspection component 412 to the contact probe 1010, the controller 301 may become electronically (e.g., wirelessly or wired) coupled to the controller 301. In this regard, any data detected from the contact probe 1010 may be transmitted to the controller 301 and stored in the database 406 along with the three-dimensional models described previously herein. In this regard, non-destructive inspection may detect defects that may otherwise be undetectable by scanners 310, 610. Thus, by further inspecting the bladed rotor with the contact probe, additional data may be provided to the IBR analysis system in step 204 of method 200 to provide for a more robust repair analysis and determination, in accordance with various embodiments. In various embodiments, the non-destructive inspection performed in step 1102 may be performed for the entire bladed rotor. The present disclosure is not limited in this regard. In various embodiments, although illustrated as replacing steps 910, 912 of process 900, the present disclosure is not limited in this regard. For example, in various embodiments, steps 1102 and 1104 are performed in addition to steps 910 and 912 of process 900.

Figure 12:
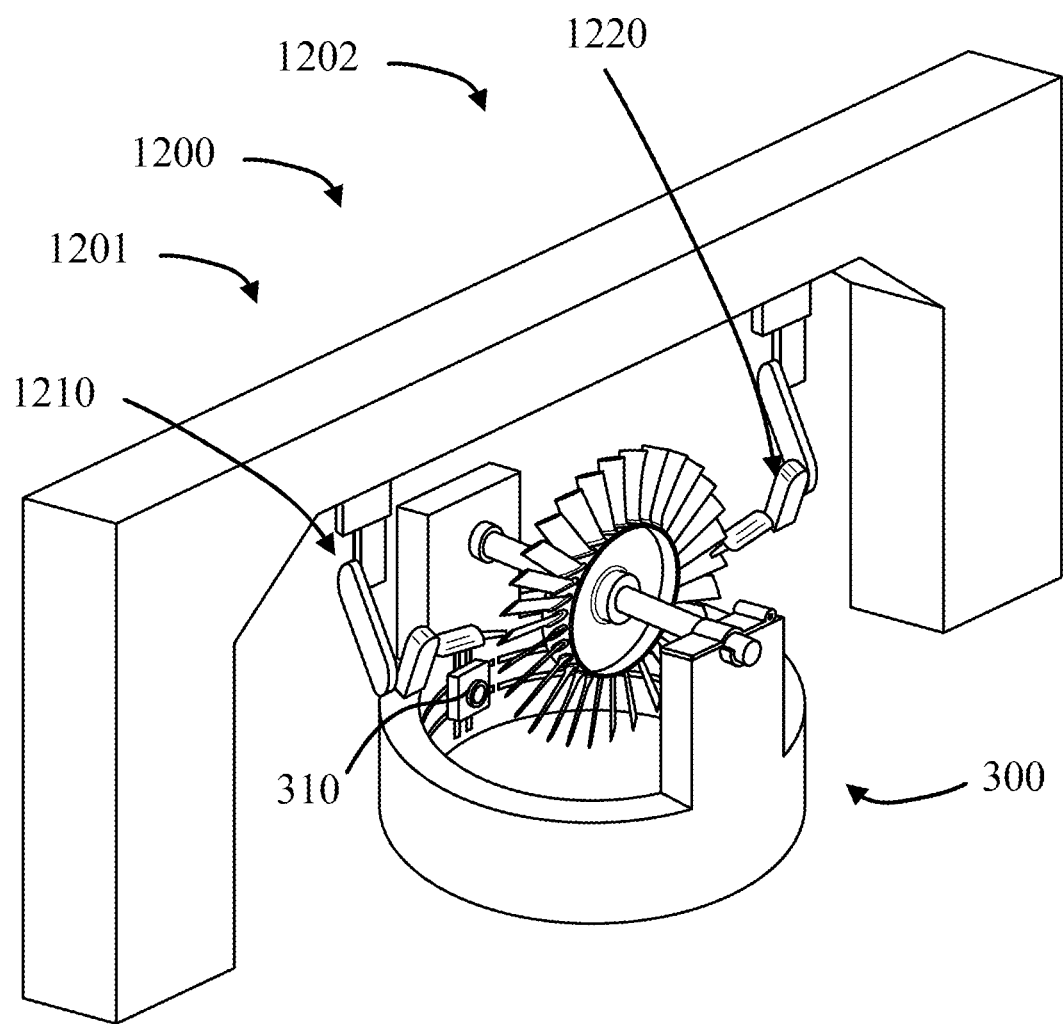
FIG. 12 illustrates a perspective view of a bladed rotor inspection system, in accordance with various embodiments.
Figure 13:
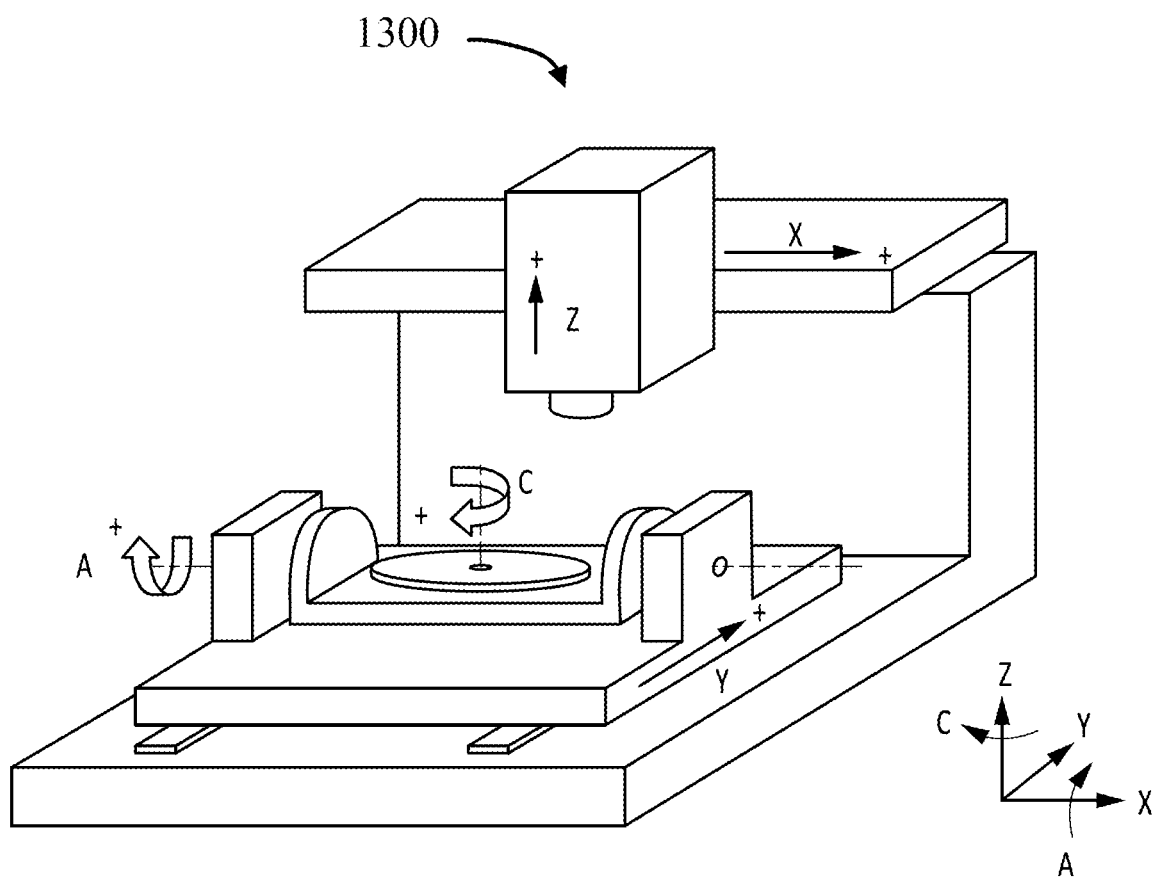
FIG. 13 illustrates a perspective view of a bladed rotor inspection system, in accordance with various embodiments.

Referring now to FIG. 12, a perspective view of a system 1200 is illustrated, in accordance with various embodiments. In various embodiments, the system 1200 includes an IBR inspection system 1201 and/or an IBR repair system 1202. In various embodiments, the IBR inspection system 1201 includes the IBR inspection system 300 with additional elements as described further herein. For example, the IBR inspection system 1201 further comprises a robotic arm 1210. In various embodiments, the robotic arm 1210 is utilized as a sole inspection component 412 of the inspection system 1201, in combination with the scanner 310 and/or scanner 610, or the like. In various embodiments, the robotic arm 1210 is utilized as an inspection component 412 in an inspection step 202 of method 200 and utilized as a repair component during the repair step 206 of method 200. In this regard, the robotic arm 1210 may be configured to couple to and uncouple from various tools (e.g., a scanner, such as scanner 310, 610, a probe, etc., a subtractive component, such as a mill, a lathe, a serrated cutter, etc., an additive component, such as a DED head, an auger, etc.). The present disclosure is not limited in this regard.

In various embodiments, the IBR repair system 1202 comprises a robotic arm 1220. In this regard, the system 1200 may comprise a robotic arm 1210 for an inspection system 1201 and a robotic arm 1220 for a repair system 1202, in accordance with various embodiments. In various embodiments, the robotic arms 1210, 1220 are not limited for use in a respective system (e.g., inspection system 1201 or repair system 1202). For example, robotic arms 1210, 1220 may be utilized in both systems 1201, 1202, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An inspection device, comprising:
   a support structure;
   a motor;
   a shaft operably coupled to the motor, the shaft extending from a first side of the support structure to a second side of the support structure, the shaft configured to couple to a bladed rotor;
   a scanner moveably coupled to the support structure, the scanner configured to generate a three-dimensional model for the bladed rotor, wherein the support structure comprises a base having an arcuate shape; and
   a track system, the scanner configured to move along the track system, the track system comprising:
      a curved track coupled to a radially inner surface of the base and extending circumferentially around the base, and
      a vertical track, the scanner operably coupled to the vertical track, the vertical track configured to travel along the curved track.

2. The inspection device of claim 1, wherein the scanner is one of a coordinate measuring machine or a structured light scanner.

3. The inspection device of claim 1, wherein the three-dimensional model is a point cloud.

4. The inspection device of claim 1, further comprising a controller in electronic communication with the motor and the scanner.

5. The inspection device of claim 4, wherein the controller is configured to:
   command the scanner to scan a first portion of the bladed rotor;
   command the motor to rotate the shaft a fixed amount; and subsequently
   command the scanner to scan a second portion of the bladed rotor.

6. The inspection device of claim 5, wherein the controller is further configured to:
   determine the motor has rotated the shaft 360 degrees; and
   generate the three-dimensional model based on data received from the scanner.

7. An article of manufacture including a tangible, non-transitory computer-readable storage medium having instructions stored thereon that, in response to execution by a processor, cause the processor to perform operations comprising:
   commanding, via the processor, a scanner to scan a first portion of a bladed rotor;
   commanding, via the processor, a motor to rotate a shaft coupled to the bladed rotor a fixed amount;
   commanding, via the processor, the scanner to scan a second portion of the bladed rotor, wherein the scanner traverses along a track system in response to the commanding, the track system comprising:
      a curved track coupled to a radially inner surface of a base and extending circumferentially around the base, and
      a vertical track, the scanner operably coupled to the vertical track, the vertical track configured to travel along the curved track;
   determining, via the processor, whether the scanner has scanned between 95% and 100% of an external surface area of the bladed rotor; and
   generating, via the processor, a three-dimensional model in response to determining the scanner has scanned between 95% and 100% of the external surface area of the bladed rotor, the bladed rotor comprising a rotor disk and a plurality of blades extending radially outward from the rotor disk.

8. The article of manufacture of claim 7, wherein the first portion of the bladed rotor is a blade.

9. The article of manufacture of claim 7, wherein generating the three-dimensional model includes generating a point cloud of the bladed rotor.

10. The article of manufacture of claim 7, wherein the scanner comprises one of a coordinate measuring machine (CMM) or a structured light scanner.

11. The article of manufacture of claim 7, wherein the operations further comprise receiving, via the processor, location data of the scanner relative to a datum; and
   generating the three-dimensional model relative to the datum.

12. An inspection system for a bladed rotor, the inspection system comprising:
   a support structure comprising a base having an annular shape and defining a radially inner surface, a first vertical support extending upward from the base, and a second vertical support extending upward from the base, the first vertical support disposed opposite the second vertical support;
   a first sensor;
   a second sensor;
   a track system;
   a scanner moveably coupled to the support structure via the track system, the track system comprising:
      a curved track coupled to the radially inner surface of the base and extending circumferentially around the base, and
      a vertical track, the scanner operably coupled to the vertical track, the vertical track configured to travel along the curved track;
   a motor operably coupled to a shaft, the shaft rotatably coupled to the support structure, the shaft configured to be coupled to the bladed rotor, the shaft extending from the first vertical support to the second vertical support; and
   a controller in electronic communication with the first sensor, the second sensor, the scanner, and the motor, the controller configured to:
      command the scanner to scan the bladed rotor;
      receive, from the first sensor, a location of the scanner during the scan;
      command the motor to rotate a fixed amount in between scans;
      determine, from the second sensor, an angular position of the bladed rotor relative to an initial position; and
      generate a three-dimensional model of the bladed rotor.

13. The inspection system of claim 12, wherein the controller is further configured to command an inspection component to move the scanner relative to the bladed rotor during the scan.

14. The inspection system of claim 12, wherein the scanner is configured to travel along the track system.

15. The inspection system of claim 12, wherein the scanner comprises one of a coordinate measuring machine (CMM) or a structured light scanner.

16. The inspection system of claim 12, wherein the three-dimensional model of the bladed rotor is a point cloud.

17. The inspection system of claim 12, wherein the inspection system is configured to scan between 99% and 100% of an external surface area of the bladed rotor.

* * * * *